United States Patent Office 3,326,833
Patented June 20, 1967

3,326,833
COMPOSITION COMPRISING A CHLORINATED OLEFIN RUBBER AND AN ETHYLENE COPOLYMER
Charles F. Raley, Midland, Mich., assignor to The Dow Chemical Company, Midland, Mich., a corporation of Delaware
No Drawing. Filed Mar. 6, 1964, Ser. No. 350,125
13 Claims. (Cl. 260—28.5)

ABSTRACT OF THE DISCLOSURE

New compositions of matter comprising blends of a chlorinated olefinic rubber and from 5–95 weight percent based on the blend of a copolymer of ethylene and an alkyl ester of an alpha, beta-monoethylenically unsaturated monocarboxylic acid are described. The blends have improved flow properties compared to the unmodified olefin polymers and are therefore of value in the molding and extrusion arts. They are also useful as self-extinguishing, water-proof, structural membranes when modified with additives such as carbon black and antimony trioxide. The unmodified blends can also be used for rug backings, fibers and cable coatings. The blends can be cross-linked with dicumyl peroxide to provide elastic filaments, wearing apparel and solvent-resistant mats.

This invention relates to chlorinated olefin polymers and copolymers. More particularly, the invention is related to halogenated olefin polymers having improved properties by incorporation therein of specially prepared ethylene copolymers.

Chlorinated olefins and diolefins having an amorphous rubber nature are well known to the art. The materials in the uncured and unplasticized state are soft, rubber-like materials with extremely poor flow properties. For example, when polyethylene is chlorinated, a crosslinking takes place which drastically reduces the melt index, e.g. from a melt index of about 0.5 in the parent polyethylene to a melt index of about 0.0 in the chlorinated polyethylene. The extremely poor flow properties of these olefinic rubbers render them difficult to fabricate into useful articles in conventional thermoplastic processing equipment.

Attempts to improve the properties of these rubbers by incorporating therewith other polymeric materials are often unsuccessful due to the general incompatibility of these rubbers with most resinous materials. As a result of this incompatibility, the blend compositions often disintegrate and form noncoherent cumbly masses which must be subsequently coalesced with considerable expenditure in time and energy, and which often possess physical properties which render them unfit for practical use.

To facilitate the utility and processibility of these olefinic rubbers, it is extremely desirable that a material be found which can be milled thereinto without an unreasonable amount of effort and which will be compatible with and improve the mechanical properties of the olefin rubbers.

It is an object of this inventon to provide new rubber compositions.

A further object of this invention is to provide halogenated olefin rubber compositions having improved mechanical properties.

A still further object of this invention is to provide uniform and coherent blends of halogenated olefin polymer compositions with ethylene copolymers wherein the blended compositions exhibit improved flow properties when compared to the unmodified olefin polymer.

Other objects and advantages of this invention will be apparent to one skilled in the art upon reading the accompanying disclosure.

According to the present invention, an elastomeric composition having improved tensile and flow properties is prepared by intimately blending a synthetic rubber selected from the group consisting of halogenated α-olefin and diene polymers with a copolymer of ethylene with a lower alkyl ester of an acrylic acid. By the term "an acrylic acid," as used throughout this specification, is meant an α,β-monoethylenically unsaturated monocarboxylic acid having from 3 to 7 carbon atoms. Representative specific examples of such acids are acrylic acid, methacrylic acid, ethacrylic acid, crotonic acid, isocrotonic acid, tiglic acid, angelic acid, senecioic acid. Among these, acrylic acid itself ($CH_2=CH-COOH$) is preferred. As used herein, the expression "lower alkyl" means an alkyl group having from 1 to 8 carbon atoms, for example, the methyl, ethyl, isopropyl, n-butyl and the 2-ethylhexyl groups. Representative specific examples illustrative of lower alkyl esters of an acrylic acid are methyl acrylate, ethyl acrylate, methyl methacrylate, ethyl methacrylate, methyl ethacrylate, ethyl ethacrylate, isopropyl crotonate, n-butyl tiglate and 2-ethylhexyl senecioate.

The amount of acrylic acid ester contained in the ethylene copolymer may vary from 2 percent by weight to 75 percent by weight, 15 to 35 percent by weight being preferred.

The compositions of the present invention contain about 5 percent to about 95 percent by weight of the ethylene/acrylic ester copolymer and from about 5 to about 95 percent of the halogenated olefin polymer. It is found that compositions containing between about 15 and about 80 percent by weight of the copolymer and between about 20 and 85 percent by weight of the halogenated polyolefin are most desirable and are preferred.

The halogenated olefins and diolefin polymers which are beneficially blended with the copolymers of the present invention are generally made by chlorinating the olefin and diolefin polymers in homogeneous solution, for example, in chloroform, carbon tetrachloride, etc., or in aqueous suspension, as is well known in the art.

The polymer that is halogenated may be a homopolymer of an α-olefin containing 2 to 8 carbon atoms such as ethylene, propylene, butylene, isobutylene, pentene-1, octene-1, diisobutylene, etc.; copolymers consisting solely of two or more such 2 to 8 carbon atom α-olefins; conjugated 1,3-dienes such as butadiene, isoprene, chloroprene and copolymers of α-olefins and conjugated 1,3-dienes such as the copolymer of 1,3-butadiene or isoprene and butylene (butyl rubber). The halogenated polyolefin may beneficially be a chlorinated polyethylene having a combined chlorine content between about 25 and 55 percent by weight. Further, it is preferred that the chlorinated polyethylene be essentially amorphous, that is, the crystallinity of the polymer be less than one percent as measured by X-ray diffraction. Amorphous chlorinated polyethylene is more compatible with the ethylene/acrylic ester copolymers and a lesser amount of the ethylene copolymer is required to be blended with the amorphous chlorinated polyethylene than with the more highly crystalline chlorinated polyethylene to obtain an equivalent improvement in flow properties.

Although a combined chlorine content of the chlorinated polyethylene between about 25 and 55 percent by weight is desirable, chlorinated olefin polymer products having lesser or greater degrees of chlorination may also be advantageously employed.

The olefin polymer rubber-ethylene/acrylic ester copolymer blends of this invention may be prepared in any suitable manner using common mixing equipment, including roll mills or internal mixers. Control of temperatures in the processing of the rubbers and the ethylene copolymers is important in order to properly flux and disperse the components of the blend. A practical procedure involves first fluxing the halogenated polyolefin rubber on the rolls of a mill at a temperature ranging from about 125° to about 170° C. followed by the addition of the ethylene copolymer. Alternatively, the rubber and copolymer may be simultaneously added to the roll mill at about 125° to about 170° C. Minor amounts of heat stabilizers (e.g. 2 parts per hundred) such as epoxy resins, and tin-containing compounds may be added to the polymer blends to prevent unnecessary thermal degradation during the blending process.

Products obtained when the ethylene copolymer and halogenated polyolefin components are employed in the ranges stated above range from somewhat stiff, tough, gristly materials to soft, yielding materials. The halogenated olefin polymers and the ethylene copolymers described herein are sufficiently compatible in the proportion disclosed and each contributes a desirable characteristic to the final composition. For example, the tensile properties of the blend are in considerable measure dependent upon the tenacity and elasticity of the α-olefin rubber component. However, as the proportion of the ethylene copolymer is increased in the polymer blend, the flowability of the mixture increases although the blend becomes harder and stiffer.

After the rubber and copolymer components are homogeneously dispersed and thoroughly fluxed, fillers, reinforcing agents such as talc, silica, zinc, oxide, titanium dioxide, calcium carbonate, magnesium oxide, kaolin, U.V. stabilizers such as carbon black, self-exinguishing agents such as antimony trioxide and halogenated paraffin wax, pigments and other compounding ingredients, if required, are then added and homogeneously blended into the mixture.

The polymer blend compositions herein described have numerous uses. When compounded with about 3 to about 5 parts by weight carbon black and about 1 to about 20 parts by weight of a self-extinguishing agent such as antimony trioxide and a halogenated paraffin wax used either individually or in combination they may be extruded to form membranes for waterproofing structural parts of various kinds such as roofs, terraces, bridges, and retaining dams. The excellent mechanical resistance, weather resistance, low temperature flexibility, and flame retardance of these blends make them excellent substitutes for the paper or felt boards impregnated with bitumen which are presently used. Such waterproof boards of bituminized paper or felt have various disadvantages such as poor mechanical resistance at both low and high temperatures, as a result of which the boards tend to break or crack readily when exposed to seasonal temperature variations when in use.

Other applications wherein the polymer blends of the present invention may be employed include rug backings, compression and injection moldings, fibers and cable coatings.

If desired, the blends may be cross-linked by such agents as dicumyl peroxide, to yield insoluble, non-thermoplastic resins suitable for use as elastic filaments, water-resistant apparel and footwear, and solvent-resistant mats.

The following examples serve to illustrate the invention, but are not intended to limit it thereto.

*Example 1*

Unless otherwise noted, all the polymer blends subsequently reported were prepared by the following standard procedure.

The halogenated rubber olefin polymers, the physical properties of which are listed in Table I below, were treated on mixing rolls for 10 to 15 minutes at a temperature of 170° C. while varying amounts of ethylene/ethyl acrylate copolymers of different melt index containing 20 percent by weight ethyl acrylate, the physical properties of which are listed in Table II below, were added. Two parts per hundred, based on the weight of the rubber, of an epoxy heat stabilizer consisting of the diglycidyl ester of Bisphenol A (4,4'-isopropylidenediphenol) was also added to inhibit thermal degradation of the polymer blend during milling. The rough sheets were cut into small pieces which were molded under contact pressure into a 0.050" thick sheet on a heatable hydraulic molding press at 170° C. The physical properties of these sheets prepared from the polymer blends are listed in Tables III and IV.

TABLE I.—OLEFINIC RUBBERS

| Sample | Rubber | Gravity | Staudinger, Mol. Wt. | Percent Cl | Percent Crystalinity |
|---|---|---|---|---|---|
| A | Chlorobutyl Rubber | 0.93 | ~40,000 | 1.1–1.3 | Nil |
| B | Chlorinated Polyethylene | 1.1 | (1) | 36.8 | <1 |
| C | ----do---- | 1.1 | (1) | 34.6 | 5.8 |
| D | ----do---- | 1.1 | (1) | 31.8 | 8.1 |

1 Not determined.

TABLE II.—ETHYLENE/ETHYL ACRYLATE COPOLYMER

| Ethylene/ethyl Acrylate Copolymer Number: | Physical Properties of Copolymer | | | |
|---|---|---|---|---|
| | Ultimate Tensile 1 (p.s.i.) | Tensile Modulus 2 (p.s.i.) | Yield Elongation 3 (Percent) | Melt Index 4 |
| I | 1,270 | 3,300 | 30 | 20 |
| II | 2,230 | 5,400 | 20 | 2.5 |

1 Ultimate tensile is a measure of tensile strength and is the maximum tensile load per unit area of original cross-section carried by the test specimen. All of the tensile measurements were made, in general, according to ASTM D-412-61T, with the modification that the test specimen was a dumbbell of 0.1 x 0.5 inch cross-section and ⅝ inch gauge length. Samples were pulled on an Instron tensile tester at 2 inches per minute cross head speed.
2 Tensile modulus is the slope of the stress strain curve at the origin and is expressed in pounds per square inch. Tensile modulus is a measure of the stiffness or flexibility of the polymer. The higher the tensile modulus the stiffer the material.
3 Yield elongation is the extension recorded at the moment of irreversible elongation of the specimen, expressed as percentage of the orginal length of measured elongating section.
4 Melt index is determined by ASTM D-1238-57T and is expressed in decigrams per minute. Melt index is an empirical measure of the flow properties of polymers. The useful range of melt index for many applications is about 0.05 to 5.0. At a melt index below this range, the blends are too intractable to be processed by conventional methods requiring good melt flow. The optimum range of melt index is about 0.2 to 2.0.

TABLE III.—BLEND OF CHLOROBUTYL RUBBER (SAMPLE A, TABLE I) WITH ETHYLENE COPOLYMER (SAMPLE II OF TABLE II)

| Sample No. | Ethylene Copolymer | Percent Copolymer in Blend | Physical Properties | | | |
|---|---|---|---|---|---|---|
| | | | Ultimate Tensile (p.s.i.) | Tensile Modulus (p.s.i.) | Yield Elongation (Percent) | Melt Index |
| 1 | None (control) | 0 | Nil | Nil | | Nil |
| 2 | Ethylene/ethyl Acrylate (II) | 50 | 690 | 1,350 | 42 | 0.59 |

TABLE IV.—BLENDS OF CHLORINATED POLYETHYLENE (SAMPLES B–D) WITH THE ETHYLENE COPOLYMERS OF TABLE II

| Sample No. | Rubber Sample | Copolymer Sample | Percent Copolymer in Blend | Physical Properties | | | |
|---|---|---|---|---|---|---|---|
| | | | | Ultimate Tensile (p.s.i.) | Tensile Modulus (p.s.i.) | Yield Elongation (Percent) | Melt Index |
| 1 | B | (¹) | 0 | 2,170 | 1,700 | 21 | 0.0 |
| 2 | B | I | 30 | 1,950 | 2,800 | 21 | 1.2 |
| 3 | B | I | 50 | 1,560 | 2,900 | 21 | 5.7 |
| 4 | B | II | 30 | 2,200 | 2,700 | 21 | 0.26 |
| 5 | B | II | 50 | 2,240 | 3,400 | 21 | 0.60 |
| 6 | B | II | 70 | 2,210 | 4,500 | 19 | 1.4 |
| 7 | C | (¹) | 0 | 2,670 | 1,000 | 32 | 0.02 |
| 8 | C | I | 30 | 2,090 | 1,600 | 27 | 0.30 |
| 9 | C | I | 50 | 1,590 | 2,400 | 26 | 3.9 |
| 10 | D | (¹) | 0 | 3,220 | 1,800 | 23 | 0.02 |
| 11 | D | I | 30 | 2,060 | 2,900 | 21 | 0.12 |
| 12 | D | I | 50 | 1,430 | 2,900 | 22 | 2.7 |
| 13 | D | I | 70 | 1,300 | 3,500 | 21 | 6.9 |
| 14 | D | II | 30 | 2,520 | 3,200 | 18 | 0.06 |
| 15 | D | II | 50 | 2,250 | 4,000 | 19 | 0.20 |
| 16 | D | II | 70 | 2,310 | 4,300 | 20 | 1.1 |

¹ None (Control).

As is illustrated in Tables III and IV, the blending of various chlorinated olefin and diolefin rubbers with the ethylene/ethyl acrylate copolymers of the present invention, results in a stiffer composition having an improved melt index without a substantial diminution of tensile properties. The improvement in melt index is particularly significant for this property of the blends renders them much more desirable for extrusion and molding purposes than the original rubber base material.

A number of additional compounded mixtures were made with various blends of chlorinated polyolefin rubbers with ethylene/ethyl acrylate copolymer I described in Table I following the procedures described above, to which, in some cases, titanium dioxide filler was additionally added. The physical properties of sheets, molded from these mixtures are listed in Table V.

TABLE V.—FORMULATED BLENDS

| Sample No. | Chlorinated Rubber copolymer Ratio | Rubber Sample | Carbon Black, p.p.h. | Sb₂O₃, p.p.h. | Chlorinated wax, p.p.h. | TiO₂, p.p.h. | Physical Properties | | | | |
|---|---|---|---|---|---|---|---|---|---|---|---|
| | | | | | | | Ultimate Tensile (p.s.i.) | Tensile Modulus (p.s.i.) | Yield Elongation (percent) | Melt Index | Self-extinguishing |
| 1 | 70:30 | B | 3 | 0 | 0 | 0 | 1,880 | 3,300 | 20 | 0.90 | No. |
| 2 | 70:30 | B | 3 | 7 | 7 | 0 | 1,900 | 3,200 | 21 | 4.1 | Yes. |
| 3 | 90:10 | B | 3 | 7 | 7 | 0 | 2,230 | 2,400 | 21 | 0.14 | Yes. |
| 4 | 90:10 | B | 3 | 4 | 4 | 0 | 2,150 | 2,200 | 21 | 0.09 | Yes. |
| 5 | 70:30 | B | 0 | 30 | 0 | 0 | 1,710 | 2,800 | 21 | 1.4 | Yes. |
| 6 | 70:30 | B | 10 | 0 | 0 | 0 | 1,790 | 3,100 | 20 | 0.97 | No. |
| 7 | 70:30 | B | 10 | 7 | 7 | 0 | 1,800 | 3,200 | 20 | 1.2 | Yes. |
| 8 | 70:30 | B | 0 | 0 | 0 | 20 | 1,850 | 3,200 | 20 | 0.84 | No. |
| 9 | 70:30 | B | 0 | 7 | 7 | 20 | 1,800 | 3,000 | 21 | 1.5 | Yes. |
| 10 | 90:10 | C | 0 | 0 | 0 | 0 | 1,900 | 1,100 | 30 | 0.24 | No. |
| 11 | 90:10 | C | 3 | 7 | 7 | 0 | 2,050 | 1,100 | 27 | 0.28 | Yes. |

Example 2

Three grams of carbon black, 7 grams of antimony trioxide, and 7 grams of "Chlorowax 70" a product of the Diamond Alkali Co. consisting of a paraffin wax chlorinated to 70 percent chlorine content were compounded with 100 grams of an 80/20 blend of a chlorinated polyethylene (Sample No. B) and an ethyl acrylate/ethylene copolymer (Sample No. I), and two parts per hundred, based on the weight of the chlorinated olefin polymer, of a heat stabilizer consisting of the diglycidyl ester of Bisphenol A. The compounded mixture was milled and compression molded according to the procedure of Example 1 to form a material which had the following physical properties:

Ultimate tensile, p.s.i. _____ 1890
Tensile modulus, p.s.i. _____ 2600
Yield elongation, percent _____ 21
Melt index, decig./min. _____ 0.44

The compounded mixture was found to be self-extinguishing, i.e., a test strip of the compounded material, when ignited in the flame of a bunsen burner, was extinguished instantaneously upon removal from the flame. While in the flame, the sample burned without dripping, qualifying as Class I self-extinguishing (according to Underwriter's Subject No. 94 test).

The high tensile strength and the high elongation before yield of these compounded polymer blends renders them capable of deforming without breaking in response to thermal expansions of the structural parts on which they are fixed for rendering such parts waterproof or water-repellent. The superior capacity to undergo deformation without breaking, to conform to changes in structural parts due to seasonal temperature variations, also adapts the new sheets to being fixed around corners and over convex parts to be protected.

What is claimed is:

1. A chlorinated olefinic rubber composition having improved flow properties, said composition comprising
   (a) 5 to 95 percent by weight of an olefinic rubber selected from the group consisting of elastomeric chlorinated olefin polymers and chlorinated diene polymers and
   (b) 95 to 5 percent by weight of a copolymer of ethylene and an alkyl ester of an $\alpha,\beta$-monoethylenically unsaturated monocarboxylic acid, the alkyl group having from 1 to 8 carbon atoms and the acid having from 3 to 7 carbon atoms, said copolymer containing in the copolymer molecule from about 2 to about 75 percent by weight of the alkyl ester comonomer component.

2. The composition of claim 1 wherein the elastomeric chlorinated olefin polymer is a chlorinated polyethylene having a crystallinity as determined by X-ray diffraction of less than one percent.

3. The composition of claim 1 wherein the chlorinated olefin rubber composition is a chlorinated copolymer of isobutylene and isoprene.

4. The composition of claim 1 wherein the α,β-monoethylenically unsaturated monocarboxylic acid is acrylic acid.

5. The composition of claim 1 wherein the alkyl ester comonomer component is ethyl acrylate.

6. The composition of claim 1 wherein the ethylene copolymer contains from about 15 to about 35 percent by weight of the alkyl ester comonomer component.

7. A self-extinguishing article of manufacture comprising
(a) about 70 to about 93 percent by weight of a polymer blend comprising
  (i) 5 to 95 percent by weight based on the polymer blend of an olefinic rubber selected from the group consisting of elastomeric chlorinated olefin polymers and chlorinated diene polymers and
  (ii) 95 to 5 percent by weight based on the polymer blend of a copolymer of ethylene and an alkyl ester of an α,β-monoethylenically unsaturated monocarboxylic acid, the alkyl group having from 1 to 8 carbon atoms and the acid having from 3 to 7 carbon atoms, said copolymer containing in the copolymer molecule from about 2 to about 75 percent by weight of the alkyl ester comonomer component,
(b) about 2 to about 10 percent by weight of carbon black, and
(c) about 5 to about 20 percent by weight of antimony trioxide.

8. An article according to claim 7 which contains from about 5 to about 20 percent by weight of a chlorinated paraffin wax.

9. An article according to claim 7 wherein the elastomeric chlorinated olefin polymer is a chlorinated polyethylene.

10. An article according to claim 7 wherein the chlorinated elastomeric olefin polymer is a chlorinated polyethylene having a crystallinity as determined by X-ray diffraction of less than one percent.

11. An article according to claim 7 wherein the α,β-monoethylenically unsaturated monocarboxylic acid is acrylic acid.

12. An article according to claim 7 wherein the alkyl ester comonomer component is ethyl acrylate.

13. An article according to claim 7 wherein the ethylene copolymer contains from about 15 to about 35 percent by weight of the alkyl ester comonomer component.

References Cited

UNITED STATES PATENTS

| | | | |
|---|---|---|---|
| 3,093,599 | 6/1963 | Mueller-Tamm | 260—890 |
| 3,113,118 | 12/1963 | Canterino. | |
| 3,227,781 | 1/1966 | Klug | 260—889 |

FOREIGN PATENTS 661,544      Great Britain.

MORRIS LIEBMAN, *Primary Examiner.*

JULIUS FROME, *Assistant Examiner.*